US012228772B2

(12) United States Patent
Lance et al.

(10) Patent No.: US 12,228,772 B2
(45) Date of Patent: Feb. 18, 2025

(54) METHODS FOR LASER BONDING OPTICAL ELEMENTS TO SUBSTRATES AND OPTICAL ASSEMBLIES FABRICATED BY THE SAME

(71) Applicant: CORNING RESEARCH & DEVELOPMENT CORPORATION, Corning, NY (US)

(72) Inventors: David Mark Lance, Elmira, NY (US); Alexander Mikhailovich Streltsov, Corning, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 253 days.

(21) Appl. No.: 17/747,231

(22) Filed: May 18, 2022

(65) Prior Publication Data

US 2022/0276445 A1 Sep. 1, 2022

Related U.S. Application Data

(63) Continuation of application No. PCT/US2020/057622, filed on Oct. 28, 2020.
(Continued)

(51) Int. Cl.
*G02B 6/36* (2006.01)
*B23K 26/073* (2006.01)
(Continued)

(52) U.S. Cl.
CPC ........ *G02B 6/3688* (2013.01); *B23K 26/0736* (2013.01); *B23K 26/18* (2013.01); *B23K 26/324* (2013.01); *G02B 6/3636* (2013.01)

(58) Field of Classification Search
CPC .. G02B 6/4236; G02B 6/4237; G02B 6/4238; G02B 6/3688; B23K 26/18; B23K 26/324; B23K 26/0736
See application file for complete search history.

(56) References Cited

U.S. PATENT DOCUMENTS 4,294,602 A 10/1981 Horne
5,389,193 A 2/1995 Coucoulas et al.
(Continued)

FOREIGN PATENT DOCUMENTS

CN 201072460 Y 6/2008
CN 105817763 A 8/2016
(Continued)

OTHER PUBLICATIONS

International Search Report and Written Opinion of the International Searching Authority; PCT/US2020/057622; Mailed Feb. 3, 2021; 19 Pages; European Patent Office.
(Continued)

*Primary Examiner* — Michelle R Connelly
*Assistant Examiner* — Kirsten D. Endresen
(74) *Attorney, Agent, or Firm* — Tamika A. Crawl-Bey

(57) ABSTRACT

Methods for laser bonding optical elements to substrates and optical assemblies are disclosed. According to one embodiment, a method of bonding an optical element to a substrate includes disposing at least one optical element onto a surface of the substrate, electrostatically affixing the at least one optical element to the surface of the substrate, and directing a laser beam into the at least one optical element. The laser beam heats an interface between at least one optical element and the substrate to a temperature that is higher than a lowest temperature of the optical element change temperature and the substrate change temperature, thereby forming a bond between at least one optical element and the substrate at a
(Continued)

bond area. The laser beam has a fluence that does not modify the substrate at areas of the substrate that are outside of the at least one optical element.

21 Claims, 8 Drawing Sheets

Related U.S. Application Data

(60) Provisional application No. 62/940,362, filed on Nov. 26, 2019.

(51) Int. Cl.
*B23K 26/18* (2006.01)
*B23K 26/324* (2014.01)

(56) References Cited

U.S. PATENT DOCUMENTS

| | | | |
|---|---|---|---|
| 5,533,158 | A | 7/1996 | Han et al. |
| 6,219,484 | B1 | 4/2001 | Rhee et al. |
| 6,411,759 | B1 | 6/2002 | Beguin et al. |
| 6,440,776 | B1 | 8/2002 | Musk |
| 6,549,713 | B1* | 4/2003 | Pi .................. G02B 6/3636 385/83 |
| 6,582,548 | B1 | 6/2003 | Dautartas et al. |
| 6,863,209 | B2 | 3/2005 | Rinne et al. |
| 7,480,432 | B2 | 1/2009 | Grzybowski et al. |
| 7,505,650 | B1 | 3/2009 | Grzybowski et al. |
| 8,148,179 | B2 | 4/2012 | Aitken et al. |
| 8,616,023 | B2 | 12/2013 | Grzybowski et al. |
| 8,873,908 | B2 | 10/2014 | Hu et al. |
| 9,000,327 | B2 | 4/2015 | Yoshikawa |
| 9,156,238 | B2 | 10/2015 | Liu et al. |
| 9,492,990 | B2 | 11/2016 | Karam et al. |
| 9,636,780 | B2 | 5/2017 | Maattanen |
| 9,666,763 | B2 | 5/2017 | Logunov et al. |
| 9,761,828 | B2 | 9/2017 | Dabich et al. |
| 9,787,345 | B2 | 10/2017 | Ames et al. |
| 10,069,104 | B2 | 9/2018 | Dabich, II et al. |
| 10,345,533 | B1* | 7/2019 | Logunov .............. G02B 6/4212 |
| 10,422,961 | B2 | 9/2019 | Logunov et al. |
| 10,457,595 | B2 | 10/2019 | Boek et al. |
| 10,545,293 | B2 | 1/2020 | Logunov et al. |
| 2002/0069497 | A1 | 6/2002 | Musk |
| 2002/0110331 | A1 | 8/2002 | Farrelly et al. |
| 2002/0136500 | A1 | 9/2002 | Gratrix |
| 2003/0198454 | A1 | 10/2003 | Chiang et al. |
| 2003/0235388 | A1 | 12/2003 | Lee et al. |
| 2007/0201797 | A1 | 8/2007 | Grzybowski et al. |
| 2012/0045169 | A1 | 2/2012 | Hu et al. |
| 2013/0094800 | A1* | 4/2013 | Ide .................. G02B 6/3692 228/121 |
| 2013/0170789 | A1 | 7/2013 | Kuang |
| 2015/0222070 | A1 | 8/2015 | Morimoto et al. |
| 2016/0268541 | A1 | 9/2016 | Dabich et al. |
| 2016/0289111 | A1* | 10/2016 | Dabich, II ............ C03B 23/203 |
| 2017/0216971 | A1 | 8/2017 | Demuth et al. |
| 2019/0022782 | A1 | 1/2019 | Dejneka et al. |
| 2019/0248123 | A1 | 8/2019 | Logunov et al. |
| 2019/0271814 | A1 | 9/2019 | Logunov et al. |
| 2020/0277225 | A1 | 9/2020 | Logunov et al. |

FOREIGN PATENT DOCUMENTS

| | | |
|---|---|---|
| CN | 108609841 A | 10/2018 |
| EP | 0262699 A1 | 4/1988 |
| EP | 1176440 A1 | 1/2002 |
| EP | 1240971 A2 | 9/2002 |
| GB | 2453945 A | 4/2009 |
| JP | 57-029021 A | 2/1982 |
| JP | 63-069734 A | 3/1988 |
| JP | 2002-022995 A | 1/2002 |
| JP | 2005-165200 A | 6/2005 |
| WO | 2016/069822 A1 | 5/2016 |
| WO | 2017/040475 A1 | 3/2017 |
| WO | 2018/093857 A1 | 5/2018 |
| WO | 2018/093862 A1 | 5/2018 |
| WO | 2019/160918 A1 | 8/2019 |
| WO | 2019/195385 A1 | 10/2019 |

OTHER PUBLICATIONS

Moriceau et al., "Overview of recent direct wafer bonding advances and applications", Advances in Natural Sciences: Nanoscience and Nanotechnology, vol. 1, 2010, 12 pages.
Shen, Ninggang et al., "Selective Laser Melting of Fiber-Reinforced Glass Composites", Mnfg Letters, vol. 14, Oct. 2017, pp. 6-9, found at https://www.sciencedirect.com/science/article/pii/S2213846317300202 (Oct. 2017).

* cited by examiner

METHODS FOR LASER BONDING OPTICAL ELEMENTS TO SUBSTRATES AND OPTICAL ASSEMBLIES FABRICATED BY THE SAME

PRIORITY APPLICATION

This application is a continuation of International Application No. PCT/US20/57622, filed on Oct. 28, 2020, which claims the benefit of priority to U.S. Application No. 62/940,362, filed on Nov. 26, 2019, both applications being incorporated herein by reference.

BACKGROUND

The present disclosure generally relates to methods for bonding optical elements to substrates and, more particularly, methods for directly bonding optical elements to substrates using a laser beam and optical assemblies comprising optical elements bonded to substrates.

Benefits of optical communication include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between an optical cable assembly and an electronic device.

Optical devices, such as optical connectors, may include optical elements secured to a substrate. These optical elements should be precisely located on a substrate so that they may be optically coupled to a mated optical device so that optical signals may be propagated between the two devices. Commonly, precise V-groove substrates are employed to precisely locate the optical elements. However, such V-groove substrates having sub-micron tolerances are costly to produce and significantly increase the cost of optical devices.

SUMMARY

Embodiments of the present disclosure are directed to methods for bonding one or more optical elements, such as optical fibers, gradient-index (GRIN) lenses, waveguides, optical filters, and the like, to a substrate using a laser beam, as well as optical connectors and assemblies resulting from said methods. As an example, the optical element is a curved element, such as a GRIN lens, a micro-lens or an optical fiber, that acts as a cylindrical lens to focus the laser beam into the substrate. The focused laser beam directly bonds the optical element to the substrate by melting the surface of the substrate material and/or the optical element material. Thus, the optical element is bonded to the substrate using a laser bonding process that produces less residual stress in the bond area than by bonding methods that melt the large volume of the material of the substrate and/or the optical element. The cylindrical lens provided by the curved optical element may eliminate the need to have a complicated optical delivery system to locally tightly focus the laser beam into the substrate material. In other words, the cylindrical lens provided by the curved optical element allows for using low numerical aperture focusing optics having larger window of focusing.

According to one embodiment, a method of bonding an optical element to a substrate includes affixing the at least one optical element to the surface of the substrate using electrostatic charging, and directing a laser beam into the at least one optical element. A material of the at least one optical element has an optical element change temperature. A material of the substrate has a substrate change temperature. The laser beam heats an interface between at least one optical element and the substrate to a temperature that is higher than a lowest temperature of the optical element change temperature and the substrate change temperature, thereby forming a bond between at least one optical element and the substrate at a bond area. The laser beam has a fluence that does not modify the substrate at regions of the substrate that are outside of the at least one optical element.

According to another embodiment, a method of bonding an optical fiber to a substrate includes disposing at least one optical fiber onto a surface of the substrate, applying a cover substrate comprising at least one groove to the substrate such that the at least one optical fiber is disposed within the at least one groove, electrostatically affixing the at least one optical fiber to the surface of the substrate by applying a voltage between the cover substrate and the substrate, and directing an astigmatically shaped laser beam into the at least one optical fiber. A material of the at least one optical element has an optical element change temperature. A material of the substrate has a substrate change temperature. The astigmatically shaped laser beam heats an interface between at least one optical element and the substrate to a temperature that is higher than a lowest temperature of the optical element change temperature and the substrate change temperature, thereby forming a bond between at least one optical element and the substrate at a bond area. The laser beam has a fluence that does not modify the substrate at regions of the substrate that are outside of the at least one optical element.

According to another embodiment, an optical assembly includes a substrate having a surface, at least one optical element bonded to the surface of the substrate, and a bond area between the at least one optical element and the surface of the substrate, wherein the bond area extends beyond a pair of modified areas in a direction parallel to the optical element.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Figure 1:
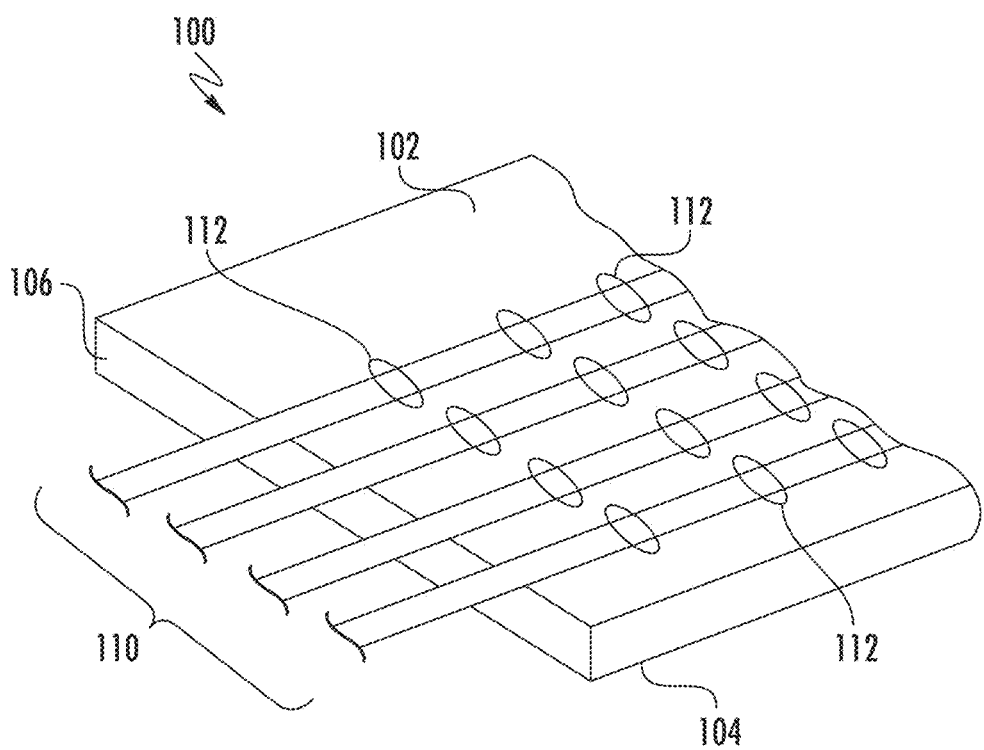
FIG. 1 schematically depicts a plurality of curved optical elements directly bonded to a surface of a substrate according to one or more embodiments described and illustrated herein.

Embodiments described herein are directed to methods for directly bonding optical elements to substrates using a laser beam, as well as to optical assemblies including optical elements bonded to substrates using a laser beam. Embodiments of the present disclosure enable optical elements, which may have a curved shape, to be precisely aligned, and directly bonded to, a flat substrate without the use of expensive V-groove substrates. For effective optical communication between the optical connector and the optical channels of the photonic integrated circuit assembly (or other optical assembly), optical elements, such as optical fibers, should be aligned to the optical channel of the photonic integrated circuit assembly with sub-micron accuracy. Precision V-groove substrates having grooves to align and precisely place optical elements such as optical fibers onto a substrate are commonly used. However, inclusion of an additional precision component adds significant cost to the assembly.

Embodiments of the present disclosure provide for a fixed attachment procedure that does not rely on the use of alignment substrates, such as V-groove substrates, as part of the optical assembly.

Laser welding techniques that weld optical fibers to substrates by melting significant volume of the material of the optical fibers and/or the substrates may result in flaws or cracks in the optical fibers and/or the substrate, thereby reducing the strength of the bond. Such melting of the material of the optical fibers and/or the substrate may also shift the position of the optical fibers, which may cause misalignment between the optical fibers and optical elements to which the optical fibers are to be optically coupled. Further, melting of the material of the optical fibers and/or the substrate at the bond areas creates residual stress, which increases with temperatures reached during laser welding.

Embodiments of the present disclosure provide for a fixed attachment procedure that relies on lower laser power for softening the material of the optical elements and/or the substrate and/or an absorbent film, thereby creating bond areas that have low residual stress and that are substantially free of flaws and/or voids.

Particularly, embodiments of the present disclosure bond optical elements to substrates by low-temperature laser processes that result in bonding of the optical elements and/or the substrate.

Because of the low processing temperature to form the one or more bond areas at the optical elements, the bond areas have low residual thermal stress, are substantially free of flaws or cracks, and are longer than bond areas form by high power laser melting processes. Thus, embodiments provide robust bonding areas that resist detachment due to external forces.

Further, the laser bonding techniques described herein may bond optical elements in place during active or passive alignment when assembling optical components. For example, epoxy may cause optical elements to shift causing misalignment during curing. Epoxy also takes time to cure, thereby slowing down the assembly process. The laser bonding techniques do not suffer from misalignment and shifting, and do not require waiting for epoxy to cure before moving on to subsequent processing steps. Such laser bonding techniques may be particularly useful in the assembly of photonics components which typically require active alignment (e.g., by use of a vision system) and fixing the alignment between components accurately and quickly.

Optical elements as used herein encompasses optical components capable of propagating optical signals. Optical elements described herein may include curved optical elements, such as, without limitation, optical fibers, gradient-index (GRIN) lenses, optical fiber stubs, cylindrical waveguides, and convex lenses. A "curved optical element" according to this disclosure is an optical element that includes at least one curved outer surface intended to be bonded to a substrate.

Various embodiments of methods for bonding optical elements to substrates using a laser and assemblies comprising a plurality of optical elements bonded to a substrate are described in detail herein.

Referring now to FIG. 1, a partial perspective view of a substrate 100 with a plurality of optical elements 110 (shown in FIG. 1 as a plurality of optical fibers) bonded thereto is schematically depicted. It should be understood that the optical elements 110 shown in FIG. 1 may also be configured as other curved optical elements, such as gradient-index (GRIN) lenses, optical fiber stubs, cylindrical waveguides, convex lenses, and concave lenses.

Figure 9:
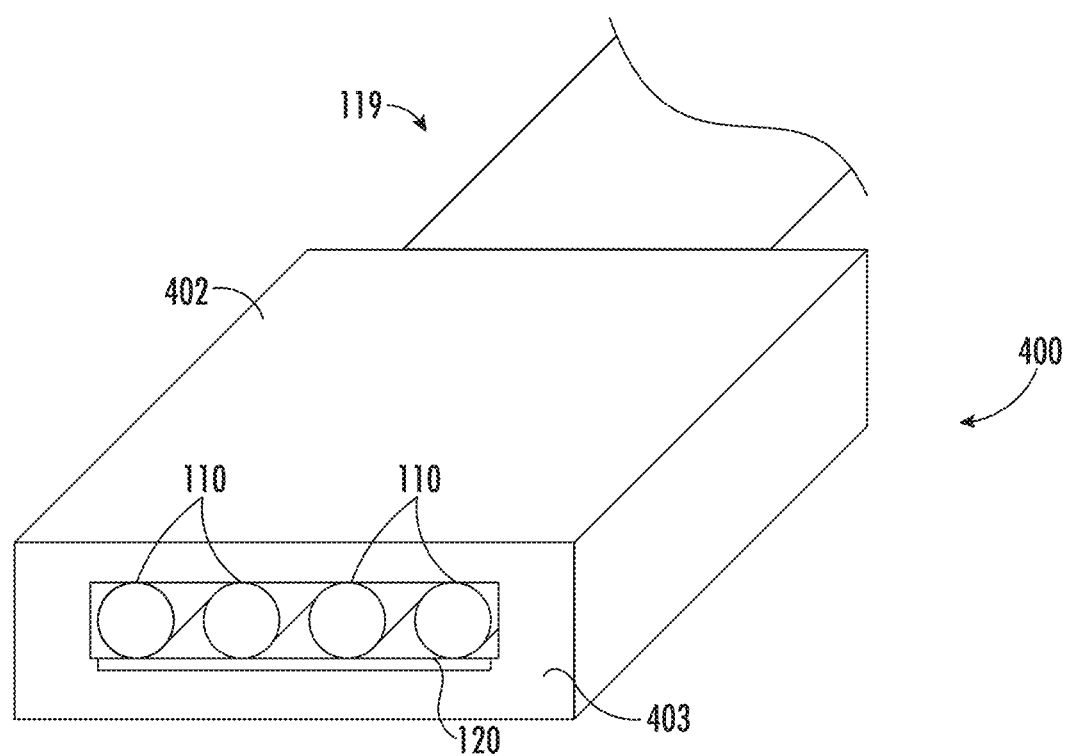
FIG. 9 schematically depicts an optical connector incorporating an optical assembly comprising optical fibers directly bonded to a substrate according to one or more embodiments described and illustrated herein.

As an example and not a limitation, the substrate 100 and the plurality of optical elements 110 may be incorporated into an optical connector (e.g., a fiber optic connector), as illustrated schematically in FIG. 9. For example, the optical connector 400 may include a housing 402 and the substrate 100, and at least a portion of the optical elements 110 may be located in the housing 402. It should be understood that embodiments described herein are not limited to optical connectors. The optical elements and substrate assemblies may be incorporated into other optical devices.

The example substrate 100 depicted in FIG. 1 comprises a first surface 102, a second surface 104 opposite the first surface 102 and at least one edge 106 extending between the first surface 102 and the second surface 104. The substrate 100 may be made of any material that absorbs the wavelength of the laser beam. For example, the material present at the first surface 102 may be in a range from 30% to 100% absorbing at the wavelength. As a non-limiting example, the material of the substrate 100 may be a dielectric material or a high-resistivity crystalline material, such as semiconductor materials. Non-limiting semiconductor materials include silicon, geranium, and silicon carbide, each of which may be doped or undoped.

Other materials may also be used for the substrate 100. As additional non-limiting examples, laser-wavelength absorbing amorphous material such as glasses may be used as materials for the substrate 100. Materials such as glass-ceramics having both an amorphous phase and one or more crystalline phases may also be utilized for the substrate 100. Further, laser-wavelength transparent glasses and glass ceramics may be used when an absorbing film 103 (FIG. 2) is applied to the first surface 102 of the substrate 100. This absorbing film 103 enables the laser beam to be absorbed to heat the interface between the first surface 102 and an optical element 110. It should be understood that the absorbing film 103 does not need to be utilized in embodiments where the material of the substrate 100 is absorbing at the wavelength of the laser beam. In some embodiments, the absorbing film 103 may be metal such that it is electrically conductive and assists in the electrostatic affixing process described below. The absorbing film 103 can also be an inorganic electrically insulating film. In this case, an electrically conducting substrate can be used. Either or both of should be capable of absorbing the laser beam. Non-limiting glass materials include alkaline earth boro-aluminosilicate glass (e.g., as manufactured and sold under the trade name Eagle XG® by Corning Incorporated of Corning, N.Y.) and alkali-aluminosilicate glass (e.g., as manufactured and sold by Corning Incorporated of Corning, N.Y. under the trade name Gorilla® Glass).

The thickness of the substrate 100 is not limited by this disclosure. The thickness of the substrate 100 may be any thickness as desired for the end-application of the optical element 110 and substrate 100 assembly.

The material of the optical element 110 should be transparent to the wavelength of the laser beam as described below, in a range from 20% to 0% absorbing at the wavelength of the laser beam. Non-limiting example materials for the optical element 110 include glass, glass-ceramics with scattering losses <10-20%, and crystal materials. Non-limiting glass materials include alkaline earth boro-aluminosilicate glass (e.g., as manufactured and sold under the trade name Eagle XG® by Corning Incorporated of Corning, N.Y.) and alkali-aluminosilicate glass (e.g., as manufactured and sold by Corning Incorporated of Corning, N.Y. under the trade name Gorilla® Glass), as well as optical fibers.

The plurality of optical elements 110 are bonded to the first surface 102 of the substrate 100 by one or more laser bonding processes as described in detail below. If needed, the optical elements 110, if configured as optical fibers, are stripped of any jacket or outer layers to remove organic material. Although FIG. 1 depicts four optical elements 110, it should be understood that any number of optical elements 110 may be bonded to a surface of the substrate 100. It should also be understood that the optical elements 110 may be bonded to the second surface 104 (FIG. 2), or both the first surface 102 and the second surface 104.

As noted above, the optical elements 110 may be fabricated from fused silica. The optical elements 110 have a round shape in cross section. However, the optical elements 110 may be elliptical in shape, semi-spherical in shape, or have any curved surface. As described in more detail below, the optical elements 110 may have at least one curved surface that focuses a laser beam to a smaller size at the contact area between the optical element 110 and the first surface 102 of the substrate 100.

Each optical element 110 is bonded to the first surface 102 of the substrate 100 at one or more bond areas 112 (also called a bond area or an additional bond area) along the length of the optical element 110. It is noted that the bond areas 112 are denoted by ellipses in FIG. 1. As described in detail below, the bond areas 112 are regions of the first surface 102 of the substrate 100 where the optical element 110 is bonded to the first surface 102 of the substrate 100 by the elevated temperature provided by a laser beam. As stated above, the optical element 110 and the substrate may each be comprised of a crystalline material or an amorphous material. The material of the optical element 110 has an optical element change temperature, which is a melting point of the optical element 110 material when it is fabricated from a crystalline material and a softening point of the optical element 110 material when it is fabricated from an amorphous material. Similarly, the material of the substrate 100 has a substrate change temperature, which is a melting point of the substrate 100 material when it is fabricated from a crystalline material and a softening point of the substrate 100 material when it is fabricated from an amorphous material.

To create the bond areas 112, the laser beam heats the interface between the optical element 110 and the substrate 100 to a temperature that is higher than the lowest of the optical element change temperature and the substrate change temperature. Thus, when both the optical element 110 and the substrate 100 are made from crystalline materials, the laser beam heats the interface to a temperature that is higher than the lowest melting point of the optical element 110 and the substrate 100. When both the optical element 110 and the substrate are made from amorphous materials, the laser beam heats the interface to a temperature that is higher than the lowest softening point of the optical element 110 and the substrate 100. When the optical element 110 and the substrate 100 are a combination of a crystalline material and an amorphous material, the laser beam heats the interface to a temperature that is higher than the lowest of the melting point of the crystalline material or the softening point of the amorphous material.

The bond areas 112 secure the optical element 110 to the first surface 102. It is noted that, in some embodiments, heating of a contact area 113 (FIG. 2) between optical element 110 and the first surface 102 of the substrate 100 may be provided by application of electromagnetic energy (e.g., microwaves) rather than a laser beam to bond the optical elements 110 to the substrate 100.

Any number of bond areas 112 may be provided along the length of the optical element 110. Bonding the optical elements 110 to the surface of the substrate 100 may eliminate the need for adhesives or organic materials, such as epoxy, to secure the optical elements 110 to the substrate 100. However, in some embodiments, adhesive is applied such that the resulting assembly has additional strength and rigidity during a solder reflow process. The assembly of the substrate 100 and the optical elements 110 may be subjected to elevated temperatures of a solder reflow process without movement of the optical elements 110 because the laser welding process keeps the optical elements in place. The laser welding provides accurate placement of the optical elements 110, and eliminates the need for costly V-groove substrates for placement of the optical elements 110.

Figure 2:
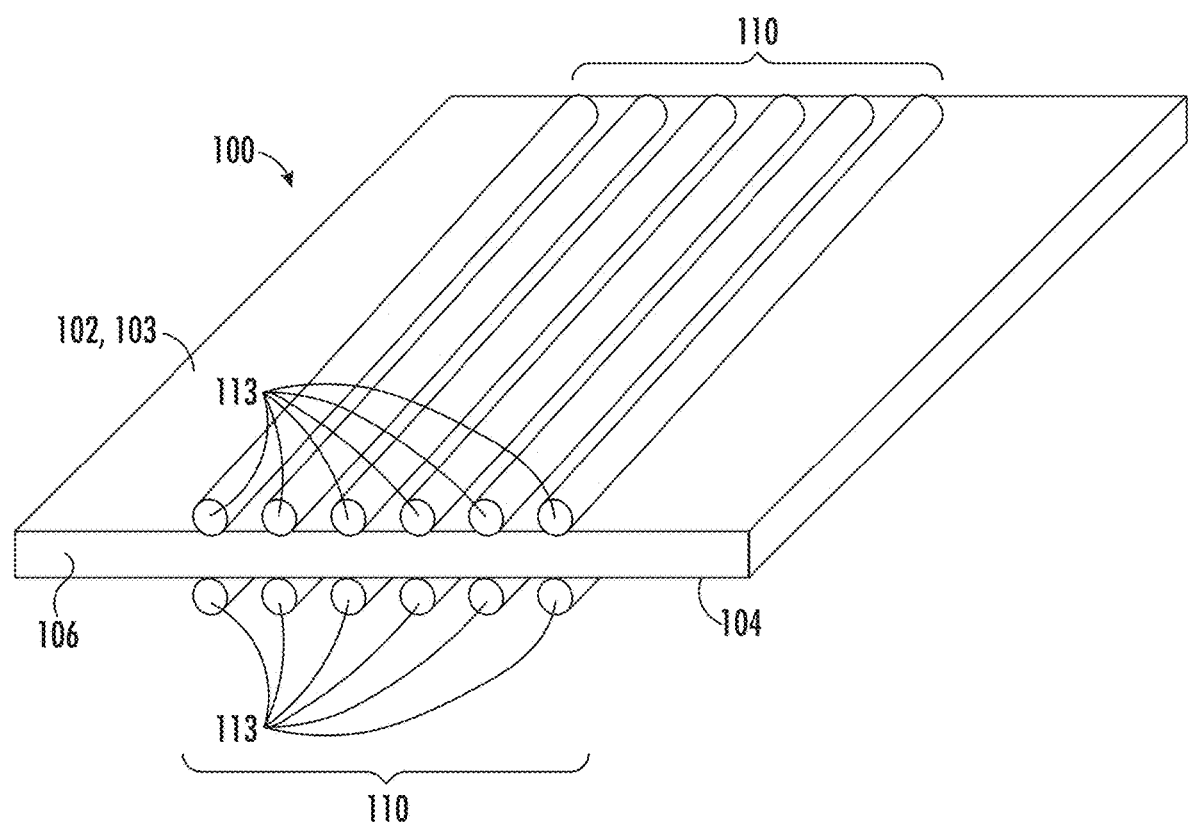
FIG. 2 schematically depicts a plurality of curved optical elements electrostatically affixed to a surface of a substrate according to one or more embodiments described and illustrated herein.

Referring now to FIG. 2, an example process for bonding curved optical elements 110, such as optical fibers, to a substrate 100 is schematically illustrated. One or more curved optical elements 110 are disposed on the planar first surface 102 of the substrate 100 such that a contact area 113 is defined by contact between the curved surface of the optical element 110 and the first surface 102. The contact area 113 generally extends along the length of the optical element 110 that it is in contact with the first surface 102.

To enable bonding between the optical elements 110 and the substrate 100, there should be substantially no gaps between the optical elements 110 and the first surface 102 (i.e., the contact area 113 should continuously extend along the length of the optical elements 110). In embodiments, the optical elements 110 are electrostatically affixed to the first surface 102 of the substrate 100. A charged substrate 100 and/or charged optical elements 110 causes the optical elements 110 to be attracted to the first surface 102, thereby causing good contact therebetween and removing gaps between the optical elements 110 and the first surface 102 of the substrate 100. Electrostatic charging allows for lower laser power and intensity for bonding the optical elements 110 to the substrate.

In some embodiments, the substrate 100 and/or optical elements 110 are charged by a plasma treatment process. Any known or yet-to-be-developed plasma treatment process may be utilized. The plasma treatment process removes organic contamination from the planar first surface 102 of the substrate 100, which results in surface activation of the planar first surface 102. The activated first surface 102 enables the optical elements 110 to be electrostatically affixed thereto. A non-limiting example of a device for effecting the plasma treatment process is the Plasma Wand sold by PlasmaEtch, Inc. of Carson City, Nev.

Figure 3:
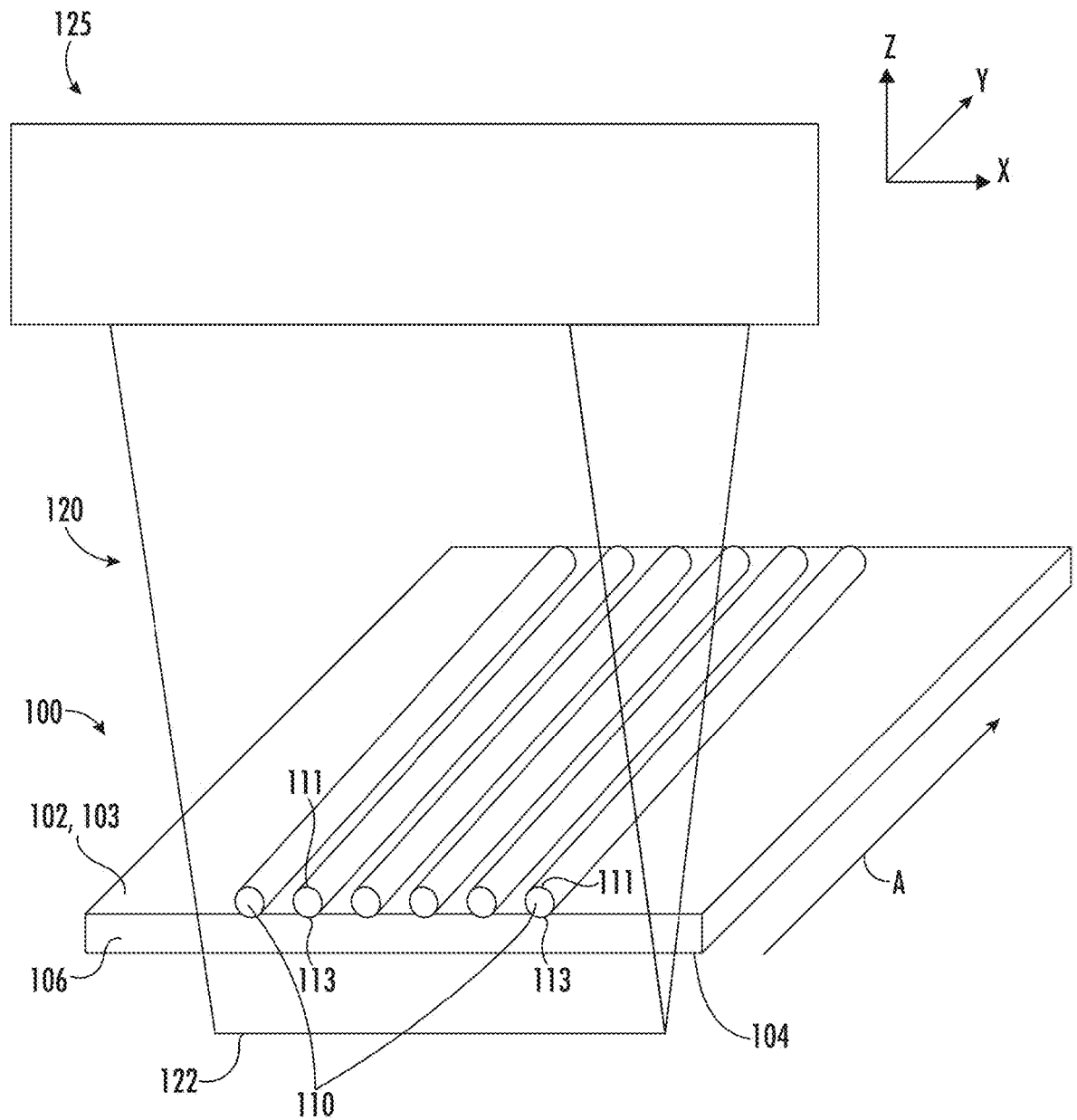
FIG. 3 schematically depicts a laser process for directly bonding a plurality of curved optical elements to a surface of a substrate according to one or more embodiments described and illustrated herein.

After the optical elements 110 are electrostatically affixed to the first surface 102 of the substrate 100, the one or more optical elements 110 are locally heated by a laser beam at desired bond areas to directly bond the one or more optical elements 110 to the first surface 102. Referring now to FIG. 3, a laser beam 120 for bonding is schematically illustrated. In the illustrated embodiment, the laser beam 120 is produced by a laser source 125 that provides an astigmatically shaped Gaussian laser beam 120 having a line focus 122 that is capable of being incident across a plurality of optical elements 110. The line focus 122 enables multiple optical elements 110 to be directly bonded by one pass of the laser beam 120. The laser source 125 may include any known or yet-to-be-developed optical components capable of generating the astigmatically shaped laser beam 120, such as, without limitation, the use of one or more cylindrical lenses. In another embodiment, the laser source 125 may be capable of scanning a collimated laser beam rapidly back and forth across the plurality of optical elements 110 to achieve a similar effect as the astigmatically shaped laser beam 120 illustrated by FIG. 3. The laser source 125 is translated in a direction parallel to the optical elements 110 as indicated by arrow A. Alternatively, the optical elements 110 and the substrate 100 may be translated and the laser source 125 may remain stationary, or both the laser source and the optical elements 110 and the substrate 100 may be translated simultaneously in opposite directions.

As illustrated by FIG. 3, the laser source 125 may be continuously operated to produce a continuous laser beam 120 to form a continuous bond area along the optical elements 110 in direction A. As stated above, the laser beam 120 has a wavelength such that optical elements 110 are transparent to the laser beam 120 and the substrate 100 absorbs the laser beam 120. As examples and not limitations, silicon is absorbing to wavelengths up to approximately 1 µm, and fused silica is transparent up to approximately 2.7 µm. As a non-limiting example, the laser beam 120 may be a green laser (515 nm-532 nm, including endpoints) or an ultraviolet laser. The laser beam 120 should have a power and an energy distribution to raise the temperature of the optical elements 110 and the first surface 102 at the contact areas 113 to a temperature above the surface softening/melting temperature of the respective materials (i.e., an optical element change temperature and a substrate change temperature as described above). The estimated laser beam fluence when welding fused silica optical fibers to a silicon substrate wherein the optical fibers electrostatically affixed to the silicon substrate by the methods disclosed herein is approximately 0.005 J/cm$^2$ (or 500 W/cm$^2$ intensity). For comparison, the estimated laser beam fluence when welding fused silica optical fibers to a silicon substrate without electrostatically affixing the optical fibers to the silicon substrate by melting the material is approximately 0.05 J/cm$^2$ (or 5 kW/cm$^2$ intensity). Thus, a much lower powered laser beam 120 is possible when bonding the optical fibers to the silicon substrate by charging the silicon substrate and/or the optical fibers.

As illustrated by FIG. 3 and stated above, the example optical element 110 has a curved surface, and has a generally circular shape. The shape of the optical element 110 enables the optical element 110 to act as a cylindrical lens that focuses an incident laser beam 120 at the contact area 113 without a complicated optical delivery system. The optical element 110 that receives the laser beam 120 focuses the laser beam 120 to a focused line (when using an astigmatically shaped laser beam) or a focused diameter at the contact area 113 that is smaller than the size of the laser beam 120 as the laser beam 120 enters the optical element 110 (i.e., at the upper surface 111 of the optical element 110). The reduction in size of the laser beam causes the first surface 102 to be heated quickly and provide the formation of a bond area 112 (FIG. 1) proximate the contact area 113 (FIG. 3).

As illustrated by FIG. 3, the heat generated by the laser beam 120 at the contact area 113 is enough to cause a bond between the optical element 110 and the first surface 102 of the substrate 100. The temperature at the bond area 112 should be more than the melting temperature or the softening temperature of the optical element 110 and the substrate 100.

When the astigmatically shaped laser beam 120 is continuously operated, there is a single continuous bond area 112 at the contact area 113 between the optical element 110 and the first surface 102 of the substrate 100. However, the astigmatically shaped laser beam 120 may be sequentially turned on and off as it travels in direction A, which results in individual bond areas 112 along the optical element 110, such as is shown in FIG. 1.

Figure 4:
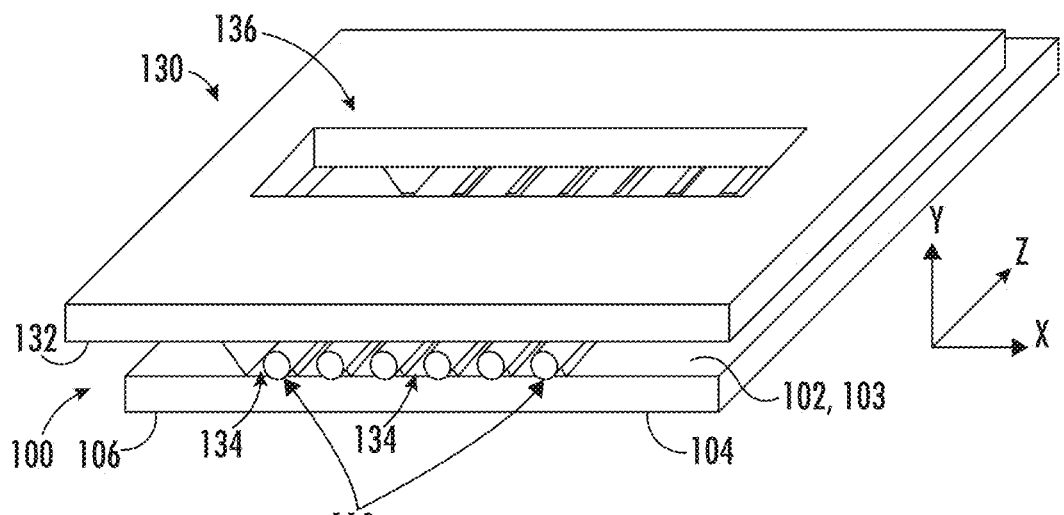
FIG. 4 schematically depicts a plurality of curved optical elements disposed on a surface of a substrate and held within grooves of a cover substrate according to one or more embodiments described and illustrated herein.
Figure 5:
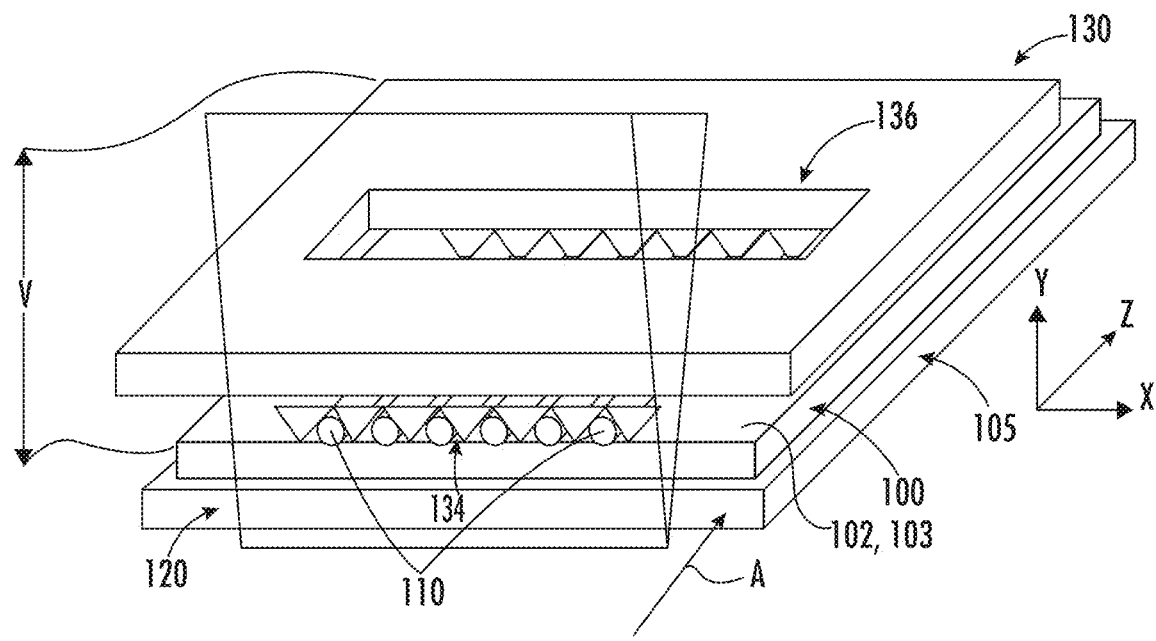
FIG. 5 schematically depicts a laser process for bonding the plurality of curved optical elements disposed on the surface of the substrate and held within grooves of the cover substrate shown by FIG. 4 according to one or more embodiments described and illustrated herein.

Another method to electrostatically affix one or more optical elements 110 to the first surface 102 (and/or the second surface 104) of the substrate 100 is by applying a voltage between the substrate 100 and the cover substrate 130, as shown by FIGS. 4 and 5. In the illustrated embodiment, a cover substrate 130 having a bottom surface 132 with one or more grooves 134 (e.g., V-grooves) is applied over at least one optical element 110 and the first surface 102 of the substrate 100 such that the optical elements 110 are disposed within one or more grooves 134. The grooves 134 allow for precise positioning of optical elements 110 on the first surface 102 on the x- and z-axes. When a plurality of optical elements 110 are utilized, a plurality of grooves 134 provide precise spacing between adjacent optical elements 110, which may be beneficial in fiber-array connector applications.

The cover substrate 130 is electrically conductive and thus may be made of any electrically conductive material.

The cover substrate 130 may include one or more windows 136 configured as openings through which the laser beam 120 may pass through to be incident on the one or more optical elements 110. The cover substrate 130 may also be an insulating material that is coated with an electrically conductive film or coating.

When the substrate 100 is fabricated from a dielectric material or has an electrically conductive absorbing film 103 on the first surface 102, no additional electrical conductors are needed. However, when non-electrically conducting glasses or glass ceramics are used without an electrically conductive absorbing film 103 for the substrate 100, the substrate 100 may be positioned on an electrically conductive support plate 105.

Referring now to FIG. 5, a voltage V is applied between the substrate 100 and the cover substrate 130. The voltage V should be enough to electrostatically affix the optical elements 110 to the first surface 102 of the substrate 100 to enable bonding. As stated above, electrically charging the substrate 100 draws the optical elements 110 close to the first surface 102 to reduce gaps therebetween. As an example and not a limitation, the voltage V may be greater than or equal to 700 V.

A laser beam 120 as described above may be translated in a direction parallel to the optical elements 110 as indicated by arrow A to produce a continuous bond area or a sequence of bond areas 112 as shown in FIG. 1 along the length of the optical elements. The laser beam 120 passes through the one or more windows 136 of the cover substrate 130 to directly bond the optical elements 110 to the substrate 100. The cover substrate 130 may be removed after the bonding process.

In some embodiments, the substrate 100 is electrostatically charged using both an initial plasma treatment and application of a voltage using the cover substrate 130 as shown in FIG. 5. The plasma treatment provides surface activation on the first surface 102 (and/or the second surface 104) while the applied voltage V further charges the substrate 100.

Figure 6:
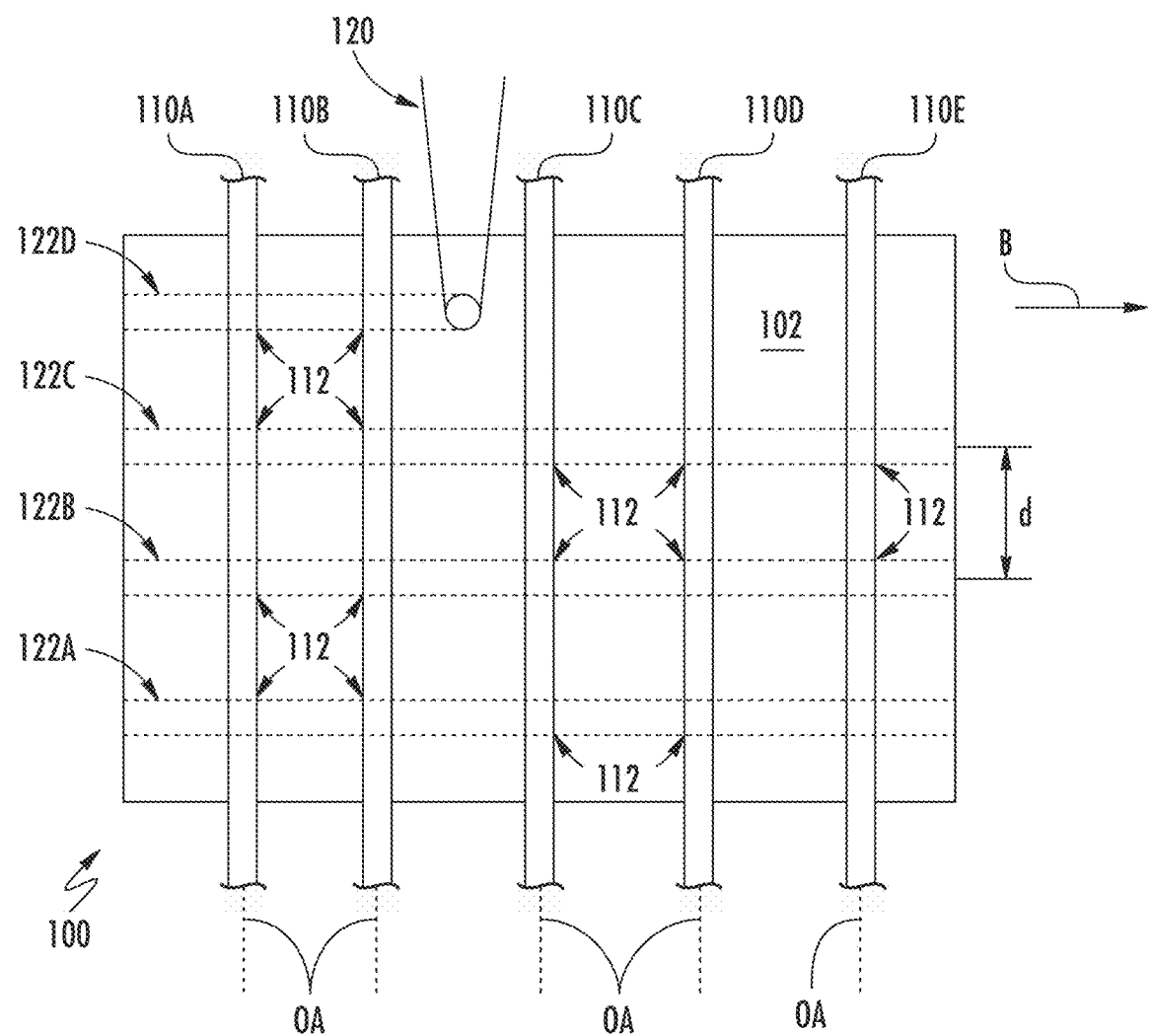
FIG. 6 schematically depicts a top down view of a plurality of curved optical elements being directly bonded to a substrate by a plurality of passes of a laser beam according to one or more embodiments described and illustrated herein.

The laser beam 120 is not limited to an astigmatically shaped laser beam or a rapidly scanned laser beam that is scanned in the x-axis and z-axis directions. In some embodiments, the laser beam 120 may be a round laser beam focused to a beam spot. FIG. 6 schematically depicts a top-down view of optical elements 110A-110E electrostatically affixed on a first surface 102 of a substrate 100. The laser beam 120 and/or substrate 100 is then moved (or translated) in a first direction (e.g., direction A) that is transverse to a longitudinal axis OA of the optical elements 110A-110E such that the laser beam passes over the optical elements 110A-110E to form bond areas 112. In the example of FIG. 6, the direction B of the laser beam 120 is perpendicular to the longitudinal axis OA of the optical elements 110A-110E. However, embodiments are not limited thereto and the laser direction can be at an angle that is different from 90 degrees with respect to the optical elements 110A-110E. It is noted that the laser beam 120 may be translated relative to the substrate 100, or the substrate 100 may be translated relative to the laser beam 120.

The laser beam 120 sequentially traverses and directly bonds multiple optical elements 110A-110E as it travels along direction B in a first pass 122A. As the laser beam 120 enters an optical element 110A-110E, it is focused as described above and creates a bond area 112.

As shown by FIG. 6, multiple passes 122A-122D of the laser beam 120 may be performed to weld the optical elements 110A-110E (e.g., optical fibers) to the substrate 100 at multiple bond areas 112 along the length of the optical elements 110A-110E. For example, a position of the laser beam 120 or the substrate 100 may be shifted by a distance d in a direction A parallel to the longitudinal axis OA of the optical elements 110A-110E after completion of a pass (e.g., the first pass 122A) to translate in a second direction to perform a subsequent pass (e.g., the second pass 122B) that may also be transverse to the longitudinal axis A of the optical elements 11A-110E. The distance d is not limited by this disclosure and may depend on the desired number of bond areas 112 desired for each optical element 110A-110E. The locations of the bond areas 112 should be spaced far enough apart to prevent proximity of weld lines, which may lead to excessive stress and cracking.

After shifting the position of the laser beam 120 or the substrate 100, the laser beam 120 or the substrate 100 is again translated traverse to the longitudinal axis OA of the optical elements 110A-110E. In FIG. 6, a fourth pass 122D is not yet complete as the laser beam 120 approaches a third optical element 110C. As a non-limiting example, the translation speed of the laser beam 120 with respect to the substrate 100 is in the range of about 5 mm/s to 200 mm/s, including endpoints.

Figure 7:
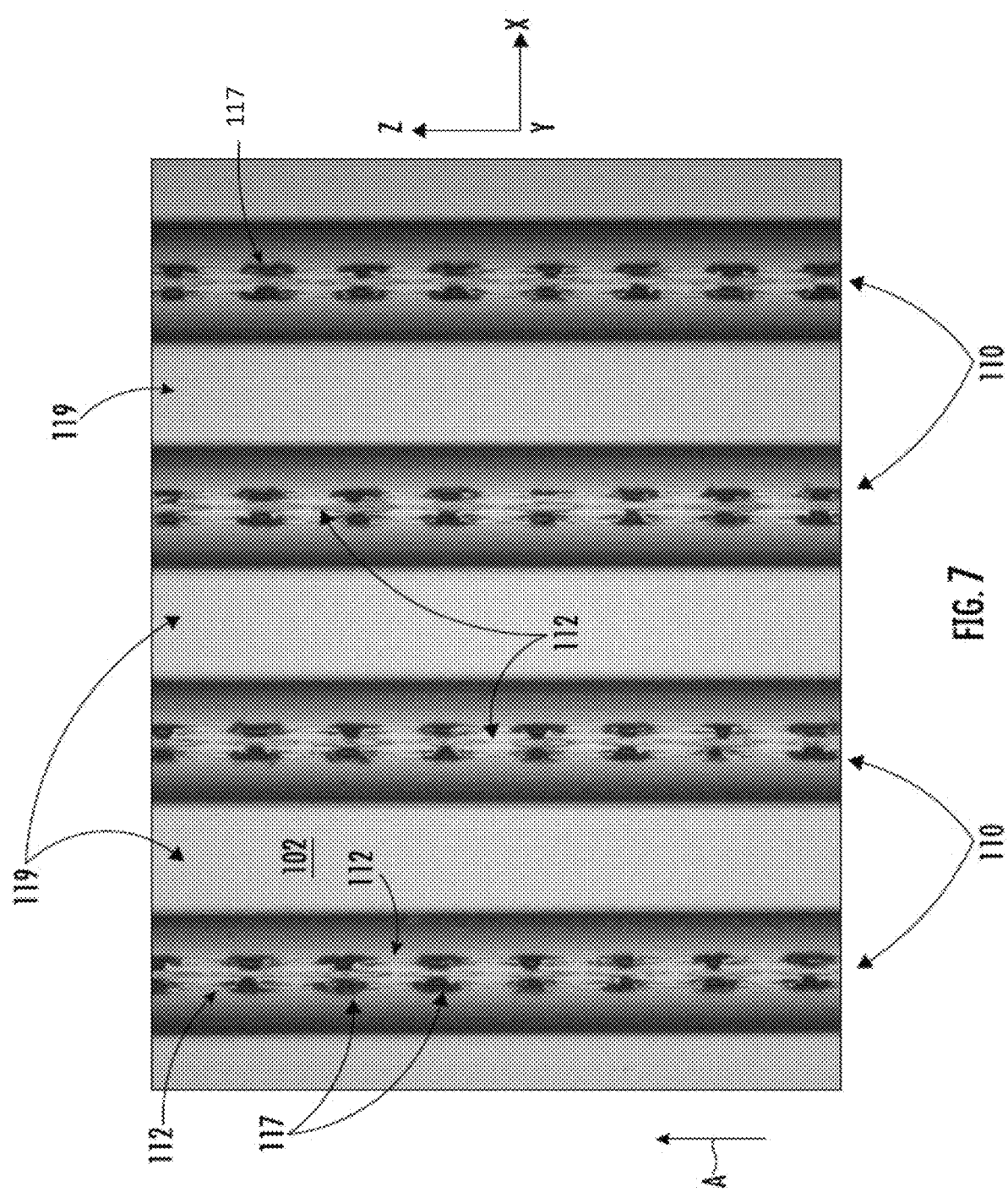
FIG. 7 is a microscope image of a plurality of optical fibers directly bonded to a substrate by a laser beam according to one or more embodiments described and illustrated herein.

Referring now to FIG. 7, a microscope image of a plurality of optical elements 110 configured as SMF-28® optical fibers manufactured by Corning, Incorporated bonded to a first surface 102 of a substrate 100 configured as a silicon substrate is provided. The microscope image of FIG. 7 was taken by disposing an index matching fluid on the first surface 102 of the substrate 100 and then placing a glass substrate on top of the optical elements 110 such that the optical elements 110 and the index matching fluid was disposed between the substrate 100 and the glass substrate. In this manner, the optical elements 110 and their contact areas 113 become visible in the microscope image.

The laser beam used to weld the optical fibers was a single-mode mode 355 nm wavelength laser beam having a power of 1-3 W that was scanned in a manner as shown in FIG. 6. The translucent areas in the image are the locations where the laser beam heated the contact area between the optical elements 110 and the substrate 100. Further, the dark areas are modified regions 117 where material is ablated and ejected such that the optical elements are not in contact with the first surface 102 of the substrate 100. Therefore, the modified regions 117 where material is ablated appear dark in the microscope image.

The reduced laser beam power and therefore the reduced laser beam fluence is such that the first surface 102 of the substrate 100 was not modified (i.e., surface modification) at areas of the first surface 102 outside of the optical elements 110 despite the laser beam being incident on the first surface 102 in these regions in the laser scanning pattern shown in FIG. 6. As used herein, the term "surface modification" is defined as more than 1 µm localized deviation from the original characteristic surface profile of the optical element or substrate, which is detected by a surface profilometer having a resolution in the vertical (orthogonal to the surface) direction less than 1 µm. Examples of such profilometers are: optical interferometers (e.g., optical interferometers sold by Zygo of Middlefield, Conn. and Keyence America of Itasca, Ill.), confocal optical profilometers (e.g., confocal optical profilometers sold by Keyence and Carl Zeiss AG of Jena, Germany), and stylus profilometers (e.g., stylus profilometers sold by KLA Corporation of Milpitas, Calif.). Accordingly, only the areas of the first surface 102 of the substrate 100 where an optical element 110 is present are modified. This results in a more robust substrate 100 and overall optical assembly.

Figure 8:
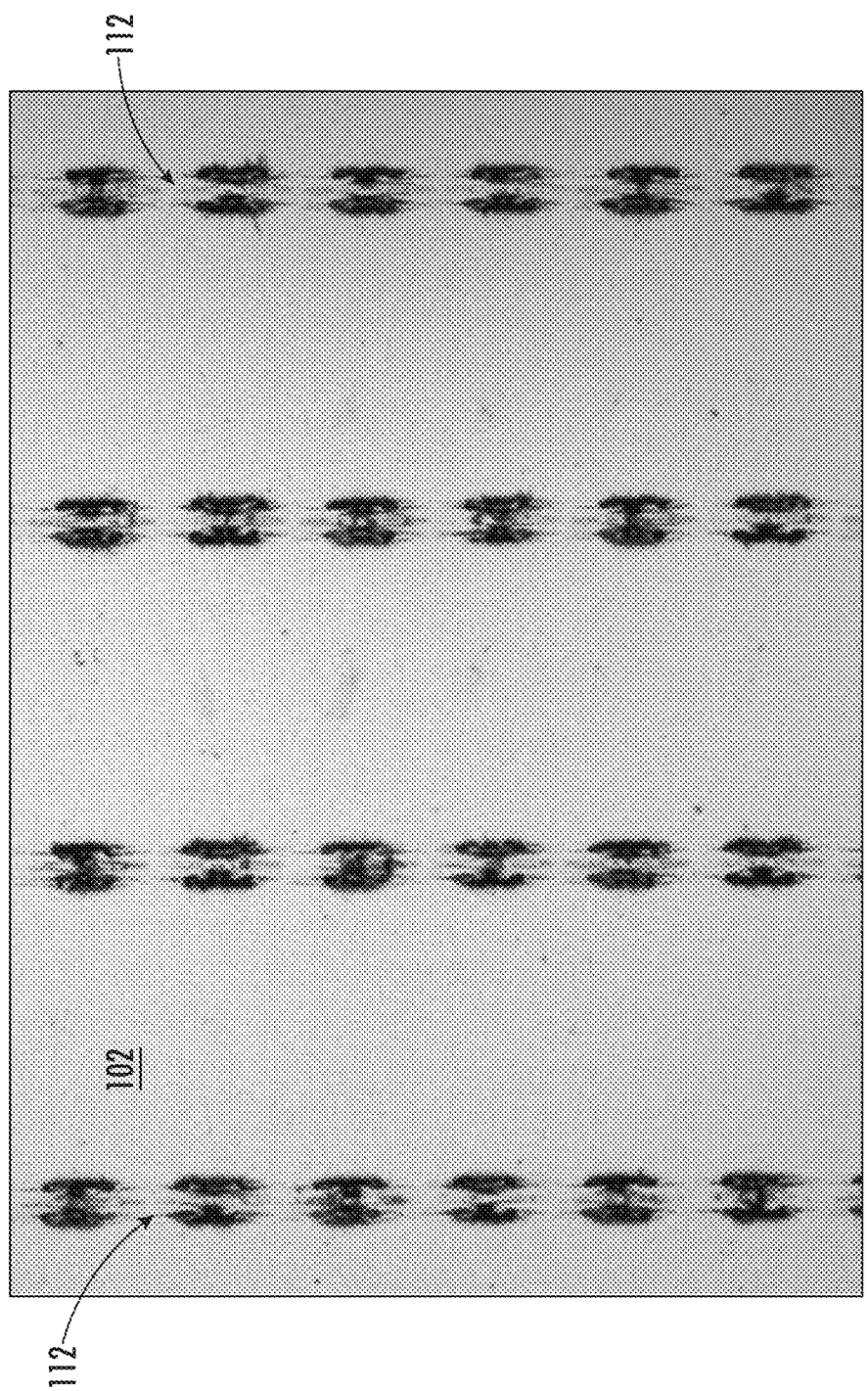
FIG. 8 is a microscope image of the substrate of FIG. 7 with the plurality of optical fibers removed according to one or more embodiments described and illustrated herein.

The bond areas 112 in the microscope image of FIG. 7 are the translucent regions that are between pairs of ablated regions 117. The individual bond areas 112 extend beyond individual pairs of ablated regions 117, thereby providing long bond areas that increase the strength of the overall bond between the optical elements 110 and the substrate 100 over bonding techniques that melt material. The locations where the laser beam heats the contact area 113 may be precisely placed such that there is a continuous bond area 112 along the length of the optical element 110. However, the locations where the laser beam heats the contact area 113 should not be too close to one another to prevent significantly overlapping bond areas 112, which may cause increased residual stress and cracking. FIG. 8 is a microscope image of the substrate of FIG. 7 with the optical elements 110 configured as optical fibers removed from the first surface 102. As shown by FIG. 8, the bond areas 112 traces are indicative of a cohesive nature of bonding.

Optical assemblies comprising the substrate 100 and the optical elements 110 bonded thereto may be incorporated into any number of larger devices depending on the application. As an example and not a limitation, the substrate 100 and the plurality of optical elements 110 configured as optical fibers of a fiber ribbon 119 may be incorporated into an optical connector 400 (e.g., a fiber optic connector), as illustrated schematically in FIG. 9. For example, the optical connector 400 may include a housing 402 and the substrate 100 and at least a portion of the optical elements 110 may be located in the housing 402. End faces of the optical elements 110 may be exposed at a mating face 403 of the housing 402 to be optically coupled to a mated optical assembly or component. It should be understood that embodiments described herein are not limited to optical connectors. The optical elements and substrate assemblies may be incorporated into other optical devices, such as photonic integrated circuits, for example.

It should now be understood that embodiments described herein are directed to methods of bonding optical elements to substrates using a low-temperature, low-stress laser bonding process. The methods described herein include electrostatically affixing the optical elements to the substrates to reduce gaps therebetween, which enables the components to be bonded to one another using laser beaming having a power that is less than what is needed when not electrostatically affixing optical elements to a substrate.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A method of bonding an optical element to a substrate, the method comprising:
    electrostatically affixing at least one optical element to a surface of the substrate; and
    directing a laser beam into the at least one optical element, wherein:
        a material of the at least one optical element has an optical element change temperature, which is a melting point of the material of the optical element when it is fabricated from a crystalline material and a softening point of the material of the optical element when it is fabricated from an amorphous material;
        a material of the substrate has a substrate change temperature, which is a melting point of the substrate material when it is fabricated from a crystalline material and a softening point of the substrate material when it is fabricated from an amorphous material;
        the laser beam heats an interface between at least one optical element and the substrate to a temperature that is higher than a lowest temperature of the optical element change temperature and the substrate change temperature, thereby forming a bond between at least one optical element and the substrate at a bond area, and
        the laser beam has a fluence that does not modify the substrate at regions of the substrate that are outside of a contact area of the substrate, the contact area of the substrate being in direct contact with the at least one optical element, wherein the laser beam is an astigmatically shaped laser beam.

2. The method of claim 1, wherein electrostatically affixing at least one optical element to the surface of the substrate comprises subjecting at least one optical element and the substrate to a plasma treatment.

3. The method of claim 1, further comprising applying a cover substrate over at least one optical element and the surface of the substrate.

4. The method of claim 3, wherein electrostatically affixing at least one optical element to the surface of the substrate comprises applying a voltage between the cover substrate and the substrate.

5. The method of claim 4, wherein the voltage is greater than or equal to 700 volts.

6. The method of claim 3, wherein the cover substrate comprises at least one groove, and the at least one optical element is positioned within the at least one groove.

7. The method of claim 3, wherein the cover substrate comprises a window, and the laser beam passes through the window.

8. The method of claim 1, further comprising translating the laser beam in a direction parallel to at least one optical element to form a plurality of bond areas along a length of at least one optical element.

9. The method of claim 1, wherein at least one optical element is a curved optical element.

10. The method of claim 1, wherein:
    the at least one optical element comprises a plurality of optical elements; and
    the laser beam is the astigmatically shaped laser beam having a line focus that passes through each optical element of the plurality of optical elements.

11. The method of claim 1, wherein the at least one optical element is an optical fiber.

12. The method of claim 1, wherein the substrate comprises silicon.

13. The method of claim 1, wherein the substrate comprises glass having a surface and an electrically conductive film that is absorbing at a wavelength of the laser beam and is disposed on the surface.

14. The method of claim 1, wherein:
    the laser beam produces a modified area on the substrate; and
    the bond area extends beyond the modified area.

15. A method of bonding an optical fiber to a substrate, the method comprising:
    disposing at least one optical fiber onto a surface of the substrate;

applying a cover substrate comprising at least one groove to the substrate such that the at least one optical fiber is disposed within the at least one groove;

electrostatically affixing the at least one optical fiber to the surface of the substrate by applying a voltage between the cover substrate and the substrate; and directing an astigmatically shaped laser beam into the optical element, wherein:

the laser beam heats an interface between at least one optical element and the substrate to a temperature that is higher than a lowest temperature of an optical element change temperature, which is a melting point of the material of the optical element when it is fabricated from a crystalline material and a softening point of the material of the optical element when it is fabricated from an amorphous material, and a substrate change temperature, which is a melting point of the substrate material when it is fabricated from a crystalline material and a softening point of the substrate material when it is fabricated from an amorphous material, thereby forming a bond between at least one optical element and the substrate at a bond area, and the laser beam has a fluence that does not modify the substrate at regions of the substrate that are outside of a contact area of the substrate, the contact area of the substrate being in direct contact with the at least one optical element.

16. The method of claim 15, wherein the voltage is greater than or equal to 700 volts.

17. The method of claim 15, wherein the cover substrate comprises a window, and the laser beam passes through the window.

18. The method of claim 15, wherein:

the at least one optical fiber comprises a plurality of optical fibers; and the laser beam has a line focus that passes through each optical fiber of the plurality of optical fibers.

19. The method of claim 15, wherein the substrate comprises silicon.

20. The method of claim 15, wherein the substrate comprises glass having a surface and an electrically conductive film that is absorbing at a wavelength of the laser beam and is disposed on the surface.

21. The method of claim 15, wherein:

the laser beam produces a modified area on the substrate; and the bond area extends beyond the modified area.

* * * * *